(12) United States Patent
Guldi

(10) Patent No.: US 7,579,541 B2
(45) Date of Patent: Aug. 25, 2009

(54) AUTOMATIC PAGE SEQUENCING AND OTHER FEEDBACK ACTION BASED ON ANALYSIS OF AUDIO PERFORMANCE DATA

(75) Inventor: Richard Guldi, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/617,444

(22) Filed: Dec. 28, 2006

(65) Prior Publication Data
US 2008/0156171 A1 Jul. 3, 2008

(51) Int. Cl.
G09B 15/00 (2006.01)

(52) U.S. Cl. .................................................. 84/470 R
(58) Field of Classification Search ................. 84/470 R
See application file for complete search history.

(56) References Cited

U.S. PATENT DOCUMENTS

| | | | | |
|---|---|---|---|---|
| 3,919,913 | A * | 11/1975 | Shrader | 84/454 |
| 4,321,853 | A * | 3/1982 | Tumblin | 84/454 |
| 4,441,399 | A * | 4/1984 | Wiggins et al. | 84/470 R |
| 4,484,507 | A * | 11/1984 | Nakada et al. | 84/612 |
| 4,779,510 | A * | 10/1988 | Van den Abbeel | 84/464 R |
| 4,976,182 | A * | 12/1990 | Obuchi et al. | 84/462 |
| 5,183,398 | A * | 2/1993 | Monte et al. | 434/227 |
| 5,287,789 | A * | 2/1994 | Zimmerman | 84/477 R |
| 5,315,911 | A * | 5/1994 | Ochi | 84/477 R |
| 5,400,687 | A * | 3/1995 | Ishii | 84/477 R |
| 5,525,062 | A * | 6/1996 | Ogawa et al. | 434/307 A |
| 5,563,358 | A * | 10/1996 | Zimmerman | 84/477 R |
| 5,567,162 | A * | 10/1996 | Park | 434/307 A |
| 5,689,077 | A * | 11/1997 | Jasinski | 84/477 R |
| 5,760,323 | A * | 6/1998 | Romero et al. | 84/470 R |
| 5,889,224 | A * | 3/1999 | Tanaka | 84/645 |
| 5,894,100 | A * | 4/1999 | Otsuka | 84/477 R |
| 5,913,259 | A * | 6/1999 | Grubb et al. | 84/610 |
| 5,952,597 | A * | 9/1999 | Weinstock et al. | 84/609 |
| 6,051,769 | A * | 4/2000 | Brown, Jr. | 84/477 R |
| 6,072,113 | A * | 6/2000 | Tohgi et al. | 84/470 R |

(Continued)

OTHER PUBLICATIONS eStand, © 2005, viewed Jan. 28, 2008, http://www.estandmusic.com/company/aboutUs/?u=&g=1&o=107196&c=7&b=2.*

Primary Examiner—Jeffrey Donels
Assistant Examiner—Robert W Horn
(74) Attorney, Agent, or Firm—Mirna G. Abyad; Wade J. Brady, III; Frederick J. Telecky, Jr.

(57) ABSTRACT

Speech or musical performance is electronically analyzed using DSP techniques and is compared to a stored text script or musical score, to enable display of and automated sequencing through multiple pages of the stored script or score. The performer can modify timing of sequencing if desired, for example dependent on performance speed or musical complexity. Automated highlighting or marking of measures or text assists the performer in keeping track of progress through the performance. During or after the performance, electronic comparison of the performance to the score or script provides feedback to the performer, highlighting differences between the actual performance and the desired performance as described by the score or script. Additional capabilities enhancing the learning process include digital recording and playback of the actual performance, and/or accompaniment by synthesis or playback of digital recording of other performance parts (for example, other instruments in an ensemble or other actors in a play).

14 Claims, 5 Drawing Sheets

U.S. PATENT DOCUMENTS

| | | | |
|---|---|---|---|
| 6,087,577 A * | 7/2000 | Yahata et al. .................. 84/478 |
| 6,107,559 A * | 8/2000 | Weinstock et al. ............ 84/634 |
| 6,156,964 A * | 12/2000 | Sahai et al. ............... 84/470 R |
| 6,180,865 B1 * | 1/2001 | Ishiguro ..................... 84/609 |
| 6,211,451 B1 * | 4/2001 | Tohgi et al. ............... 84/470 R |
| 6,215,058 B1 | 4/2001 | Molchak et al. |
| 6,333,455 B1 * | 12/2001 | Yanase et al. ................ 84/609 |
| 6,380,472 B1 * | 4/2002 | Sugiyama et al. ............. 84/478 |
| 6,380,474 B2 * | 4/2002 | Taruguchi et al. ............. 84/612 |
| 6,392,132 B2 * | 5/2002 | Uehara ..................... 84/477 R |
| 6,417,435 B2 * | 7/2002 | Chantzis et al. ........... 84/477 R |
| 6,965,067 B2 * | 11/2005 | Kondo ........................ 84/455 |
| 7,030,307 B2 * | 4/2006 | Wedel ..................... 84/477 R |
| 7,064,261 B2 * | 6/2006 | Shao ........................ 84/477 R |
| 7,164,076 B2 * | 1/2007 | McHale et al. ................ 84/616 |
| 7,271,329 B2 * | 9/2007 | Franzblau .................... 84/609 |
| 7,297,856 B2 * | 11/2007 | Sitrick .................... 84/477 R |
| 7,301,481 B2 * | 11/2007 | Okada et al. .................. 341/20 |
| 7,375,273 B2 * | 5/2008 | Sawyer-Kovelman et al. . 84/609 |
| 7,482,529 B1 * | 1/2009 | Flamini et al. ................ 84/645 |
| 7,496,830 B2 * | 2/2009 | Rubin et al. ................ 715/206 |
| 2004/0025676 A1 * | 2/2004 | Shadd ........................ 84/743 |
| 2004/0055441 A1 * | 3/2004 | Katsuta .................... 84/470 R |
| 2004/0177744 A1 * | 9/2004 | Strasser et al. ............ 84/470 R |
| 2008/0282872 A1 * | 11/2008 | Ma et al. ..................... 84/627 |

* cited by examiner

AUTOMATIC PAGE SEQUENCING AND OTHER FEEDBACK ACTION BASED ON ANALYSIS OF AUDIO PERFORMANCE DATA

BACKGROUND OF THE INVENTION

1. Field of the Invention

This invention relates to analysis of audio signals using digital signal processing (DSP) in general, and, in particular, to the application of such analysis to automatically advance pages of a musical score, presentation, or text document, and/or to electronically compare an actual musical or spoken performance to the written script or score, thus providing feedback on performance errors to the performer, or the like.

2. Description of the Related Art

Musicians, actors, speakers, and others performing or presenting musical or other material typically use a musical score or written script to assist them in their performance. Often this score or script is in the form of multiple printed pages, necessitating page turns (sequencing from one page to the next) as the work progresses. These page turns can interrupt the flow of the music or presentation, especially during instrumental musical performance when the performer needs both hands to play an instrument. A speech or business presentation is also more effective without the interruptions of page turns. The Teleprompter™, a device which scrolls or pages text on a display device in view of the speaker, has been used for years by speakers to reduce or eliminate these interruptions from page turns.

Devices which electronically display a musical score are also described in the known art, as are mechanisms for advancing pages of such a display. One known solution, as described in U.S. Pat. No. 5,760,323 issued Jun. 2, 1998, the entirety of which is incorporated herein by reference, automatically turns or updates pages of a musical score displayed on an electronic display, responsive to a manual page-turn command input or by analysis of the audio and comparison to music as written in the score. However, there exists a need for additional and improved mechanisms for determining when to automatically initiate a page turn.

Teaching of musical performance typically involves a performer and teacher. The teacher, knowing the score and therefore the expected result of the performance, listens to the performance and then critiques all or part of it. The parameters used to judge the quality of performance include (but are not limited to) adherence to the score (playing the notes as written), pitch of each note, loudness of each note and phrase, and duration of each note. Once the performer is able to perform to a reasonable level of accuracy, additional practice without a teacher continues to improve the performance. During this solo practice, the performer critiques his performance, remembering the parameters previously taught.

In a similar manner, an actor or speaker is taught or learns his script or other presentation, and through practice continues to improve that performance and its adherence to the script. During such practice, it is often helpful to hear the lines spoken by others in the performance, to learn cues and understand the overall flow of the performance. A mechanism providing such practice without the need for the entire cast would be desirable.

Electronic comparison of a performance to its score or script would be desirable, providing feedback to the performer as to those areas requiring improvement in one or more of the measured parameters. Such a device would allow more rapid improvement and lessen the need for a teacher.

SUMMARY OF THE INVENTION

The invention provides an apparatus and method which electronically analyzes the audio from spoken or musical performance (vocal, instrumental), compares that performance to a predetermined script or score for the performance, and provides automated sequencing through multiple pages of a script, score, or presentation. Additionally, this analysis and comparison to script or score provides feedback to the performer, highlighting differences between the actual performance and the desired performance as described by the script or score.

In an embodiment of the invention described in greater detail below, the analysis of incoming audio is compared with the musical score or text, and differences between the actual performance and the performance described by the script or score are made known to the performer and/or teacher as a learning and practice tool. Additional capabilities enhance utility as a learning tool, including digital recording and playback of the actual performance, synthesis and playback of the musical score or text, and/or accompaniment by synthesis of other parts (speech or musical), either setting the performance tempo or responsive to changes in tempo of the performer.

Also in the embodiment described below, automatic page sequencing and tracking of progress through the score is enhanced compared to the above-referenced prior art. The musician or performer can modify the timing of a page turn, for example causing it to occur multiple beats or measures earlier or later than normal, based on score complexity and/or performance speed, or based on learning the performer's page turning preferences during manual operation. Automated highlighting or marking of measures or text assists the performer in keeping track of progress through the performance, with visual, audible or vibration alerting after long passages of silence.

As further described below, the disclosed embodiments provide a combination of desirable properties not available in the known art. These properties include increased utility when used for page turning, feedback to the performer comparing the performance to that described by the score or text, and electronic accompaniment. Further benefits and advantages will become apparent to those skilled in the art to which the invention relates.

In the descriptions that follow, the word "score" shall be used to denote any of a musical score, text information, script, or similar.

DESCRIPTION OF THE VIEWS OF THE DRAWINGS

Example embodiments of the invention are described with reference to accompanying drawings, wherein.

Throughout the drawings, like elements are referred to by like numerals.

DETAILED DESCRIPTION

Figure 1:
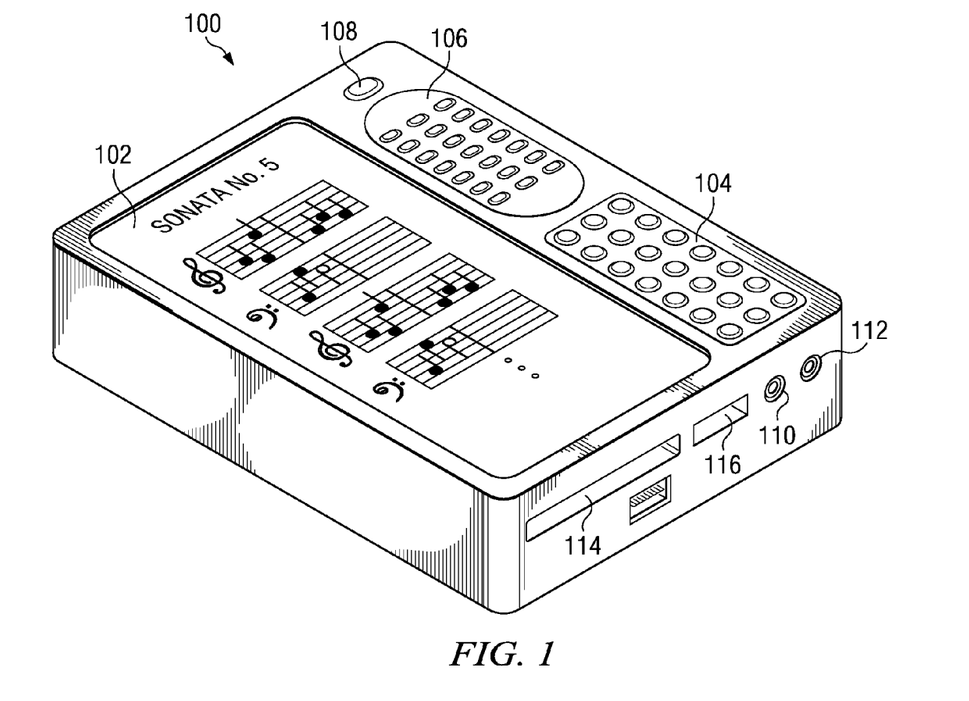
FIG. 1 is a perspective drawing of one embodiment of the present invention.

FIG. 1 shows an example physical embodiment of the disclosed invention. A case 100 is formed of plastic or other suitable material. Display 102 is a monochrome or color display, typically a flat-panel liquid crystal display (LCD) as is commonly used on laptop personal computers. The orientation of the display in this view is vertical (portrait), to display a single page of text or musical score in a format similar to the typical written page; alternatively one or more pages can be shown in a horizontal (landscape) format. Keypad 104 provides a user input mechanism for selection and control of various functions. Speaker 106 provides audible output of the variety of sounds produced by the invention, such as metronome beat, synthesized voice, synthesized music, or digitally recorded sound as received by microphone 108. A microphone input jack 110 allows an external microphone to be mounted on a stand or directly on an instrument. Headphone jack 112 is used for private listening without disturbing others, and also can be used to provide an output to a stereo system or recorder. A CD-ROM/DVD-ROM 114 provides a data input mechanism for score data, a mechanism for playing a standard audio CD, and a recorder using CD-R, CD-R/W, DVD-R or similar media to store any combination of performance audio, synthesized audio, or data such as performance/score comparison data. Memory card slot 116 enables use of portable non-volatile memory cards, such as Secure Digital™ cards or similar, from which score data may be read, or to which performance audio, synthesized audio, or data such as performance/score comparison can be stored.

Figure 2:
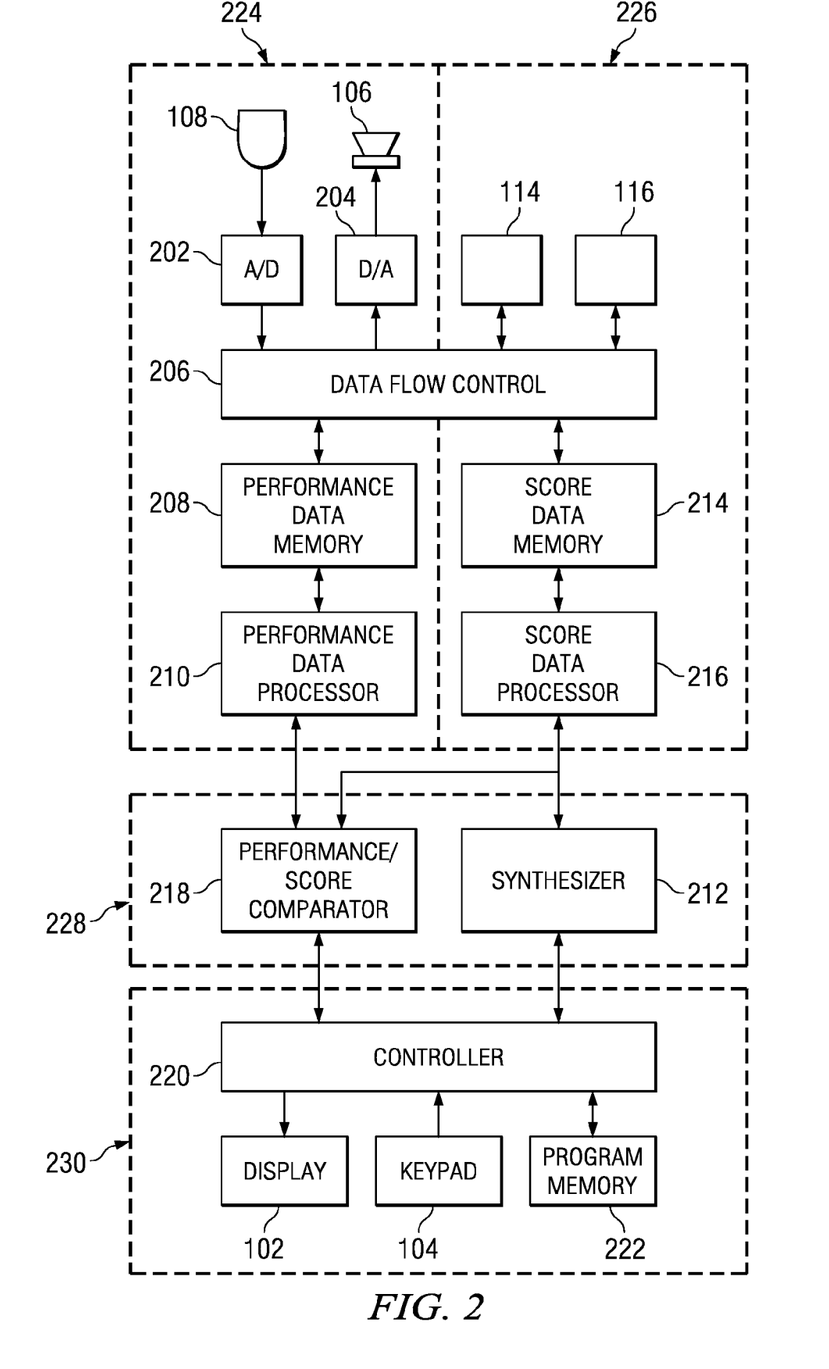
FIG. 2 is a block diagram showing components and subsystems of the present invention, and how they interconnect.

FIG. 2 is a block diagram of the overall system. Four major subsystems comprise the overall system.

The first subsystem 224 comprises microphone 108, analog to digital (A/D) converter 202, digital to analog (D/A) converter 204, speaker 106, data flow control 206 (also part of the second subsystem, to be described below), performance data memory 208, and performance data processor 210. This subsystem provides audio input and output, digitization and storage of audio signals, and processing of stored audio signals into key attributes such as pitch, loudness, duration, word, etc.

The second subsystem 226 comprises CD-ROM/DVD-ROM reader/writer 114, non-volatile memory card reader/writer 116, data flow control 206 (also part of the first subsystem, described above), score data memory 214, and score data processor 216. This subsystem provides data input and output, storage of score data, and processing of stored score data into key attributes such as pitch, loudness, duration, word, etc.

The third subsystem 228 comprises performance/score data comparison 218 and synthesizer 212. Performance/score data comparison 218 compares, in each of multiple time slots through the performance, key attributes from performance data processor 210 and score data processor 216. Synthesizer 212 uses known music synthesis techniques to convert attributes from the score data processor 216 into corresponding audio data.

The fourth subsystem 230 comprises a controller 220, display 102, keypad 104, and program memory 222. This subsystem provides user input, displayed output, and overall system control.

In subsystem 224, microphone 108 (or an external microphone connected to input jack 110) picks up audio from vocal or instrumental performance and drives A/D converter 202, in which the analog signal is amplified and digitized to a suitable resolution, such as (but not limited to) 16 bits, at a suitable sampling rate, such as (but not limited to) 44.1 KHz (standard audio CD data format). Data flow control 206 has a driven connection with A/D 202, a driven connection with synthesizer 212, a driving connection to D/A 204, a bidirectional connection to CD-ROM/DVD-ROM 114, a bidirectional connection to memory card reader/writer 116, a bidirectional connection to performance data memory 208, a bidirectional connection to score data memory 214, and a bidirectional connection to controller 220. This data flow control 206, operating under the direction of controller 220, thus regulates the flow of data among the A/D 202, D/A 204, CD-ROM/DVD-ROM 114, memory card reader/writer 116, performance data memory 208, score data memory 214, and synthesizer 212. During a performance, digitized audio from A/D 202 is routed by data flow control 206 to performance data memory 208, and typically and concurrently has a driving connection to performance data processor 210. Storage of digitized audio enables later playback of the recorded performance or comparison to the score.

During or following the performance, performance audio data from performance data memory 208 drives performance data processor 210. This processor examines the digitized audio, and using digital signal processing techniques, derives from it key attributes in successive time slots. These time slots are either fixed-length (for example, a fraction of a measure for musical performance) or variable-length (for example, a word for spoken performance). For the case of musical performance, each time slot might have a duration of $\frac{1}{128}^{th}$ the duration of a measure. This time slot duration would provide multiple samples of even the shortest notes in the measure (8 samples of a $\frac{1}{16}^{th}$ note, for example). Shorter time slot durations can also be used, but at the expense of increasing memory usage. In each time slot, key parameters impacting the quality of musical performance are determined. These parameters include, but are not limited to, one or more of pitch (frequency), loudness, and harmonic content. Pitch and loudness are fundamental measures of musical performance, and can easily be compared to the pitch and loudness called for by the musical score. Because of the short time slot duration compared to each musical note, rate of change computations on loudness provide data on attack, sibilance, vibrato, crescendo and decrescendo. Similar rate of change calculations on pitch provide data on tremolo, and rate of change of both pitch and loudness provides data on diction.

For each time slot of the performance, performance data processor 210 thus generates, in a concise format, a data set of key parameters describing the musical performance. The data rate of this describing data is typically much lower than the data rate of the digitized audio, facilitating real-time comparison of performance parameters to the score as described below. For example, assuming a 4/4 measure, with a tempo of 120 beats per minute, each measure has 4 beats or 2 seconds duration; $128^{th}$ of each measure is therefore $\frac{1}{64}^{th}$ second. Assuming, for example, that for each time slot 8 key parameters are generated, and each takes 16 bits to describe with suitable accuracy, the data rate of this performance data is therefore 64×8×16 bits per second, or 1024 bytes per second. This is significantly lower than the 1.764 megabyte per second rate of 16 bit stereo CD audio.

In subsystem 226, score data is input through either CD-ROM/DVD-ROM 114 or memory card reader/writer 116, both of which have a bidirectional connection with data flow control 206. Score data can be in any of several known formats, such as musical instrument digital interface (MIDI) or other suitable formats. Under the control of controller 220, the score data is input to and stored in score data memory 214. This data memory has a bidirectional connection with controller 220, facilitating display of the score as described below.

Either during the performance or at some earlier or later time, data from score memory data 214 has a driving connection with score data processor 216. The score data, or portions of it, are examined by score data processor 216 to generate data sets of key parameters analogous to those generated by performance data processor 210 described above, and typically using a time slot substantially identical to that time slot used by the performance data processor 210. The key parameters from the score are generated in a very different manner from those generated from the performance. For example, the pitch parameter comes directly from the note in the score; loudness from note and rest durations in the score as well as dynamic markings in the score. An essentially perfect performance thus has substantially identical key parameters (such as pitch and loudness) in each time slot from performance data processor 210 and score data processor 216.

In subsystem 228, key parameters from both the performance data processor 210 and the score data processor 216 have a driving connection with performance/score comparator 218. This performance/score comparator 218 compares, in each time slot, the key parameters from the performance and from the score, and measures the difference between each of these multiple parameters. This difference information directly correlates to how closely the performance followed the score. Because a performance will have at least a minor difference in each parameter when compared to the score, a range of acceptability for each parameter is input by the user and stored. Parameters with differences within this range cause no error output. Parameters with differences falling outside this range of acceptability are classified by magnitude of error (for example, minor, significant, major error). Default acceptability ranges for each parameter are programmed into the system, but can be modified by the user as desired. This use of range of acceptability and error classification facilitate meaningful and easily-interpreted display of performance errors. The error data is then output from performance/score comparator 218 to drive controller 220.

The comparison described above can occur during the performance or after the performance. If comparison during the performance (real-time) is desired, data from the score data memory 214 is processed by score data processor 216 as the performance progresses, for each time slot. Similarly, data from performance data memory 208 is processed by performance data processor 210 as the performance progresses. Time slots for each are generated by the controller, which has access to score data from score data memory 214. Alternatively, time slots can be generated by score data processor 216, since an easily derived parameter from such parsing is beginning and end of each beat in the measure. Real-time processing and comparison is possible due to the relatively long duration of each time slot compared with the computational power of DSP circuitry.

Comparison of the performance and score, after the performance, is also possible since the performance can be stored as long as desired in performance data memory 208, and the score data stored as long as desired in score data memory 214. If a recording of the performance is made to CD/DVD or memory card, the audio data from the recording and the score data can be loaded after the performance, and a comparison made at that time. This capability also facilitates comparing recordings of different performers to the score, using recordings which may or may not have been made on the described embodiment.

Synthesizer 212 uses known music synthesis techniques to generate audio data corresponding to score data. User control of synthesizer operation includes which part or parts to synthesize (for example, given a score for multiple instruments or voices), tempo, loudness, pitch (to allow transposing) and other attributes. Control of the synthesizer is through keypad 104 and display 102. When the synthesizer is in use, unless the performer is listening to it through headphones, the microphone 108 will pick up the synthesized audio. If analysis of the performance is desired as described below, known signal cancellation techniques are applied to the synthesizer audio as received by microphone 108, so that the analysis is of the performer's audio rather than the synthesized audio.

In subsystem 230, controller 220 controls overall operation of the invention, receiving user inputs from keypad 104, and generating text and graphical data for display 102. Operational steps of controller 220 are stored in program memory 222. A bidirectional connection between the score data memory 214 and controller 220 provides a data path between this stored score data and the display 102. Routing this score data through controller 220 enables reformatting, in controller 220, of the score data into a suitable graphical format for display 102. Another function of controller 220 is the control of data flow among the various system elements described above. Yet another function is the further processing of performance error data from performance/score comparator 218 data prior to display. For example, a performer may choose to display only performance errors in pitch while he is learning the notes of a new work.

Those skilled in the art will recognize that the described system partitioning is but one of many alternative configurations, any of which have substantially similar operational results. Alternative input mechanisms for score data are also known, such as direct or network connection to the internet for downloading score data from web sites.

Figure 3:
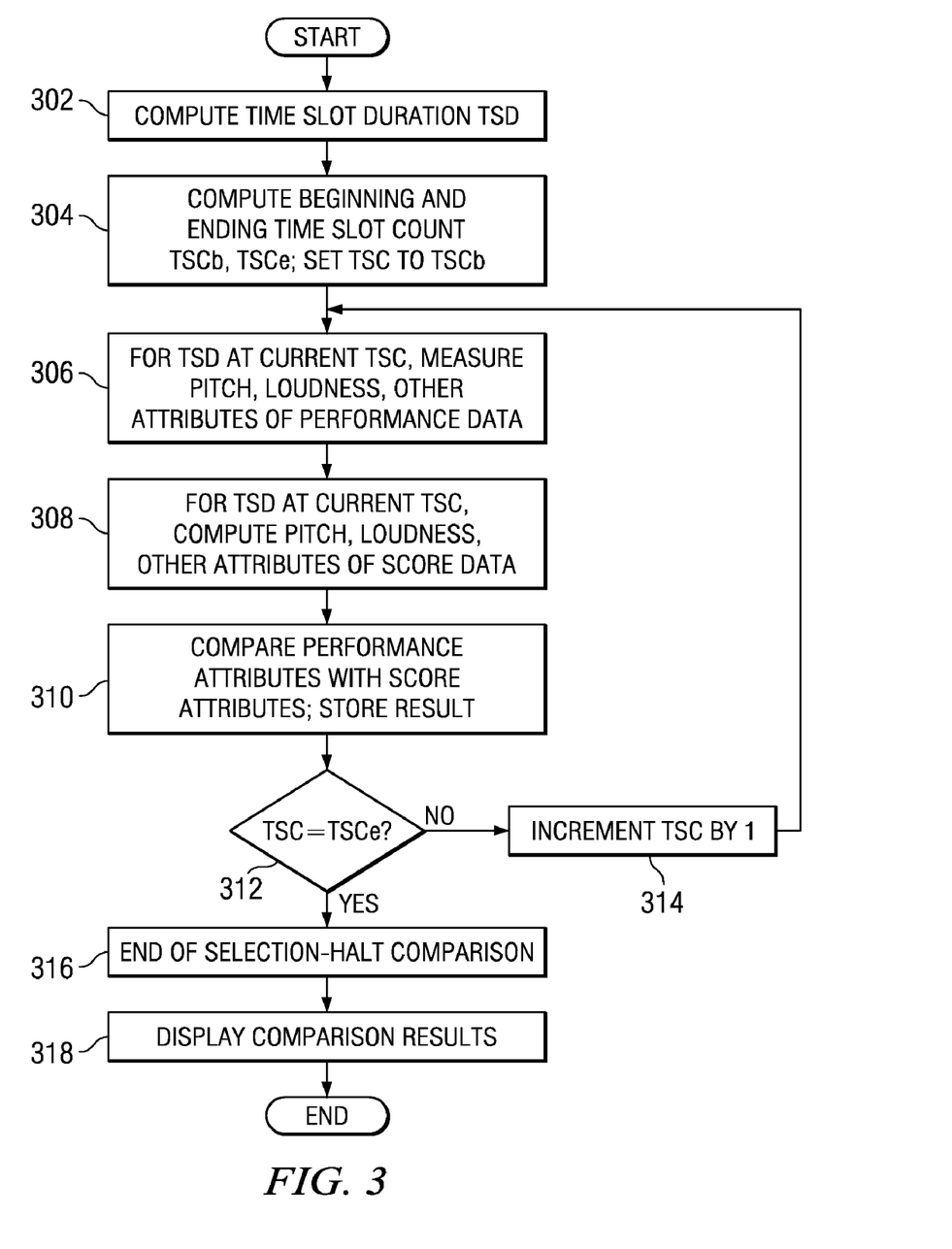
FIG. 3 is a process flow chart describing the method of operation of performance data computation, score data computation, and performance/score comparison, for musical performance.

FIG. 3 describes, in flow-chart format, the process of comparing a live or previously-recorded musical performance with the score for that performance. This novel capability provides valuable feedback to a performer, especially as he or she is learning the work. This process begins with the score loaded into score data memory 214, and the performance either saved in performance data memory 208 (in the case of a completed performance), or being saved in performance data memory 208 (in the case of real-time performance).

Step 302 computes a time slot duration (TSD), which is a measurement time interval short compared to the beat duration for the performance. For example, a piece in 4/4 time signature, played at 120 beats per minute, has a note duration of 2 seconds for a whole note, 1 second for a half note, ½ second for a quarter note, ¼ second for an $1/8^{th}$ note, and ⅛ second for a $1/16^{th}$ note (typically the shortest duration note in many pieces). To accurately measure key attributes of each note, such as pitch, loudness, and duration, each time slot is a relatively small fraction of the duration of the shortest note. In this example, assume it is desirable to subdivide each $1/16^{th}$ note duration into 8 equal time slots. This time slot is then the duration of a $1/16^{th}$ note ($1/8^{th}$ second) divided by 8, or $1/64^{th}$ of a second. The duration of a single beat at the example 120 beats per minute is ½ second. Time slot duration in this example is therefore simply beat duration divided by 32. Alternatively, measure duration can be divided by 128 for the example 4/4 time signature. Those skilled in the art will recognize that alternative divisors can be utilized with similar results.

A time slot count (TSC) is used to keep track of place in the score. Because of the fixed relationship between beat duration and time slot duration described above, each measure of music has a determinant number of time slot durations. The time slot count at each measure boundary is thus easily computed. The starting and ending points for comparison are typically described by measure number, which in step 304 are converted to beginning and ending time slot counts TSCb and TSCe, respectively. The beginning time slot count TSCb is loaded into the time slot counter.

In step 306, for a time period equal to TSD, the performance data from current time slot TSC is measured using known DSP techniques, to quantify key attributes including (but not limited to) pitch and loudness of the music or speech. If multiple performers are present, the desired performer can be electronically singled out from the ensemble using loudness or other appropriate criteria. The result is a set of numbers for the set of attributes measured. A suitable resolution for these numbers is 16 bits, but may be more or less. During the performance, the system provides an audible or visual metronome beat to facilitate timing comparisons between the score and the performance.

In step 308, for a time period equal to TSD, the score data from current time slot TSC is processed to quantify key attributes including but not limited to pitch and loudness, as called for by the score. The result is a set of numbers for the set of attributes measured, typically normalized to correspond to the number set from the performance attribute measurements. This normalization facilitates comparison in the step to follow.

Step 310 compares, for current time slot TSC, each of the key attributes from both the score and the performance. Assuming the score describes the desired performance attributes, any difference in attribute denotes an area where performance improvement is needed. As described above, even an excellent performance will differ slightly from the score in pitch, timing, or other measured attribute. Therefore, an allowable range of deviation for each parameter is defined, beyond which the attribute is highlighted as needing improvement. Default deviation ranges are programmed into the system, and can be modified by the user as desired. Deviation ranges for some attributes are intentionally wide to allow artistic license, such as loudness changes during crescendos and decrescendos. The result of these comparisons for each TSC is stored for later display.

Step 312 tests current TSC to determine if it equals TSCe; if not, TSC is incremented by 1 in step 314, then step 306 is repeated. If TSC equals TSCe (end of song or selection), step 316 halts further comparison.

Step 318 then displays the results of the performance/score comparison, in a suitable format or formats depending on the performer's needs. Sections (measures, phrases) of the score which are not acceptable are presented and highlighted, with various highlight colors or other graphical techniques used to indicate which parameter or parameters require improvement. For example, a measure in which the duration of notes was played incorrectly might be displayed with the improper notes in blue; a measure in which notes were played off pitch might display those notes in red; a measure in which notes were misplayed (the wrong note was sounded) might have the wrong notes displayed in a highlight color in addition to the correct notes in the normal color. Automated drill may also be selected by the performer, in which a section is repeatedly played and analyzed until the desired level of accuracy is achieved. Those skilled in the art will recognize that a wide variety of alternatives exist for providing the feedback of differences between the performance and the score, within the scope of this disclosure.

In musical performance, pitch and loudness are important measures of quality and adherence to the score. Pitch is readily measured as frequency of the performed note. For many notes, enough cycles occur within the TSD that pitch is determined within a single TSD. Lower frequencies may be measured for multiple TSD's to include enough cycles for accurate frequency determination. Since TSD is typically a small fraction of the shortest note duration, performed note duration is also readily determined by computing the number of TSD's during which the performed note loudness exceeds a threshold value. Similarly, the beginning and ending of the performed note is readily determined and can be compared to the score, to determine if the performance is ahead of the beat, on the beat, or lagging the beat. The rate of change of loudness, determined by comparison of successive loudness measurements at successive TSC's, measures musical attack (how rapidly the note goes from start to nominal loudness). Similar rate of change computations on loudness provide data on sibilance, vibrato, crescendo and decrescendo. Rate of change calculations on pitch provide data on tremolo.

Measurement of these two key attributes, pitch and loudness, at a rate fast enough to support rate-of-change computations, thus provides a wealth of feedback describing the quality of the performance as compared to the score. Advanced analysis of overtones (levels of harmonics of the fundamental note frequency) is also possible. Overtone analysis can provide helpful feedback in the case of an instrument (like many wind instruments) whose overtones are dependent on the performer's playing style or technique.

The analysis and feedback described above can also be used with multiple devices networked together using known technology, as in a school setting. If each student has a device, the conductor (teacher) receives feedback after a "performance" as to those individuals or sections playing well or playing poorly the selected score.

Figure 4:
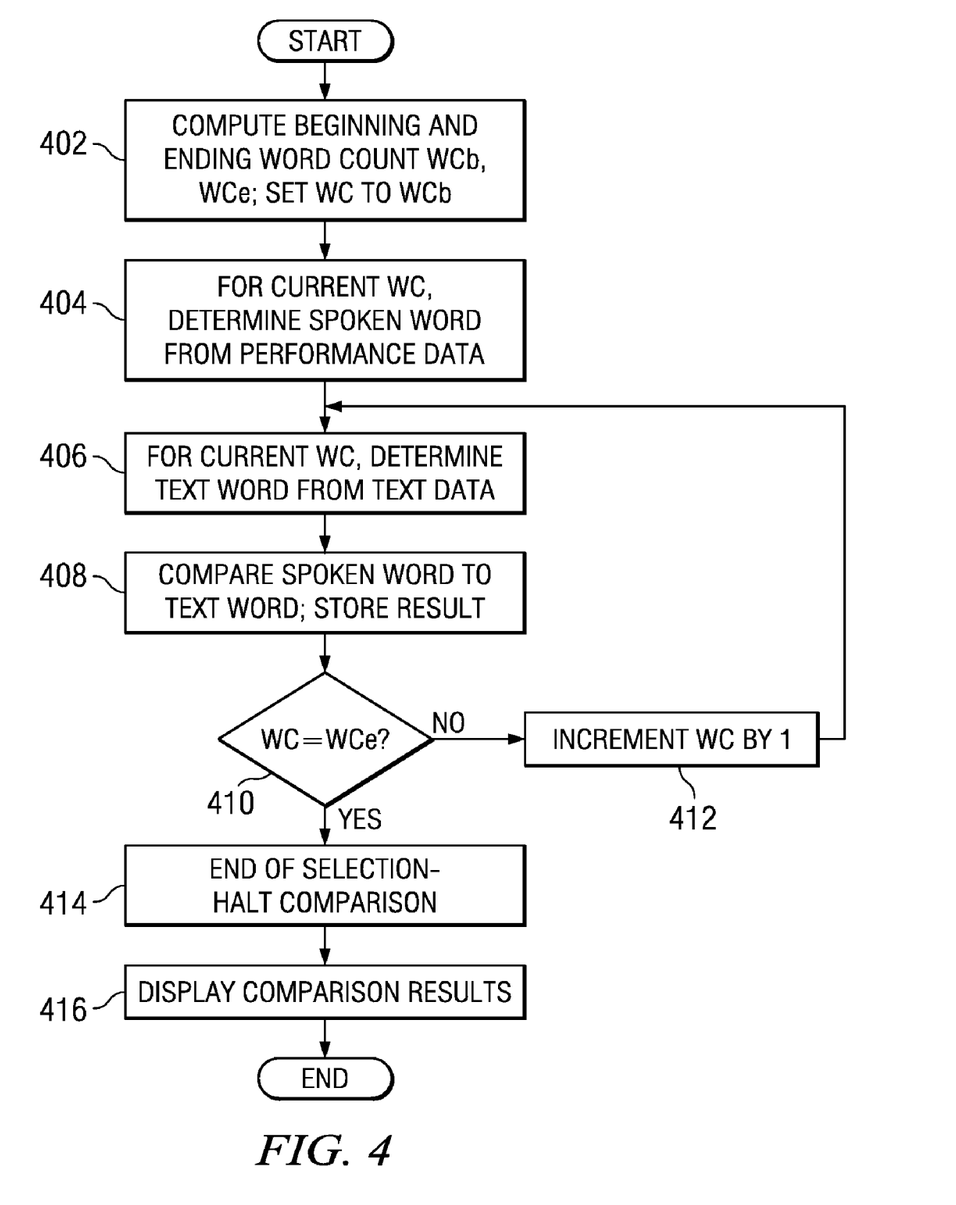
FIG. 4 is a process flow chart describing the method of operation of performance data computation, text data computation, and performance/text comparison, for spoken performance.

FIG. 4 is a flow chart showing operation as a device to compare spoken text to a text script. An actor or person preparing a speech might use the device for this purpose. This process begins with the text script loaded into score data memory 214, and the spoken performance either saved in performance data memory 208 (in the case of a completed performance), or being saved in performance data memory 208 (in the case of real-time performance). Prior to beginning the comparison process described by FIG. 4, the user selects a beginning and ending point in the script, which is displayed to facilitate such selection.

At step 402, a beginning word count WCb and an ending word count WCe are computed based on the selection of text as described above. The word counter is set to WCb. Step 404 analyzes the spoken audio for the word at WC, and using known speech recognition processes, converts that word to a text string. Step 406, for the same word count WC, retrieves the text string for the word from the text (score) data. In step 408 the two text strings are compared to determine if the correct word was spoken based on the script. This comparison process is complicated by the possibility of unequal numbers of words in the script and spoken performance. This is almost always the case, due to inadvertent pauses, spoken "uh . . . ", incorrect spoken words, omission of script words, and so forth. The comparison process is flexible to allow for such variances, while still providing a valid comparison of the script and the performance. One approach to such flexibility is to compare spoken text with multiple text strings from score data, before and after the nominal time for the word in question. This look-back and look-ahead during comparison accommodates omission of words or insertion of incorrect words, either of which can be flagged and displayed. At step 410, word count WC is tested to determine if it has reached the ending word count WCe. If not, step 412 increments WC by 1 and returns to step 404. If WC is equal to WCe, comparison is halted in step 414. Step 416 then displays the result of the selection comparison, highlighting incorrect insertions, omissions, or other variations from the desired script.

Word recognition as described above also enables direct sequencing of a presentation using spoken phrases such as "next slide", "previous slide", "back three", etc. Alternatively, recognition of the last word or words on a given page may signal the page turn. Word recognition and the ability to synthesize or play back recorded voice further enables a practice mode, where (for example) an actor listens to prerecorded spoken lines of other parts in the play, and speaks his lines at the appropriate times. These spoken words are then compared to the script to determine correctness as described above, and when to synthesize or play back the next performer's line or lines. The process described above is an example of many approaches to comparison of recorded or real-time speech to a script; those skilled in the art will recognize other approaches to similar comparison. An alternative use for the comparison as described is for learning other languages.

Figure 5:
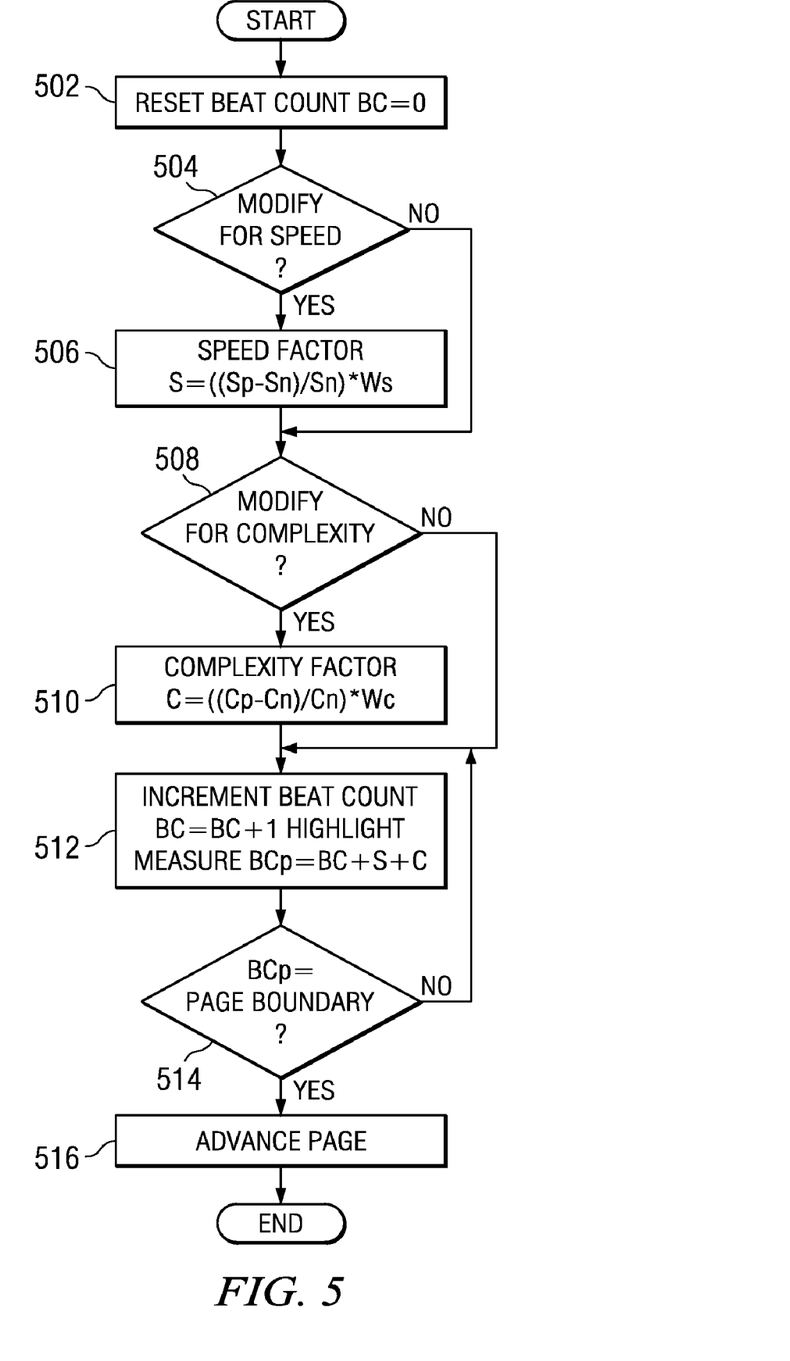
FIG. 5 is a process flow chart describing page sequencing and score progress tracking.

FIG. 5 is a flow chart showing the process of highlighting the current measure and determining when to advance to the next page. It is sometimes desirable to turn the page earlier or later than normal, for example if performance speed or score complexity at the end of a page, or the beginning of the next, is greater than some nominal value. The present invention enables the user to selectively modify the timing of page turns based on these parameters, if desired.

The start of the process described in FIG. 5 occurs at the beginning of each new page of the score. In step 502, a beat count BC is reset to zero. This beat count facilitates tracking and highlighting measures as the beat progresses through the score. The ending beat count of each page is also part of the score data, thus a comparison of beat count to ending beat count determines time for page turn in the absence of modification. Step 504 examines performer selections made prior to beginning play, to determine if he desires page turn modification based on beat speed. If no, step 506 is skipped and flow proceeds at step 508. If yes, step 506 computes a speed factor S, expressed as:

$$S=((Sp-Sn)/Sn)*Ws;$$

where Sn is a "nominal" speed, in beats per minute (BPM), at which no modification of page turn is desired; Sp is the actual performance speed, in BPM; and Ws is a weighting factor which emphasizes or deemphasizes overall speed factor S.

For example, a musical piece performed at Sp=150 BPM, with Sn=1100 BPM, and Ws=8, creates a speed factor S=4. At Sp=Sn, S=0 and no modification occurs. Note that in the case of Sp<Sn, S becomes negative. Allowing S to be positive or negative facilitates both earlier and later than normal page turn.

Step 508 tests to determine if the performer desires page turn modification based on score complexity. If no, step 510 is skipped and flow proceeds to step 512. If yes, step 510 computes a complexity factor C, expressed as:

$$C=((Cp-Cn)/Cn)*Wc;$$

where Cn is a "nominal" complexity, measured by number of notes in a measure of average complexity, at which no modification of page turn is desired; Cp is the actual score complexity, measured by number of notes in the ending measure or measures of the current page and/or beginning measure or measures of the following page; and Wc is a weighting factor which emphasizes or deemphasizes overall complexity factor C.

For example, a musical piece having Cp=16 notes in the last measure of the current page, a Cn=4 notes/measure, and a weighting factor Wc=2 creates a complexity factor C=6. At Cp=Cn, C=0 and no modification occurs. As with the speed factor described above, the complexity factor can also be positive or negative.

Those skilled in the art will recognize that alternative formulas for S and/or C, and/or alternative weighting factors, provide wide variation in page turn operation within the scope of the disclosure.

In step 512, the beat count BC is incremented, the current measure is computed (knowing current beat count, total beats on the page, and beats per measure), and the current measure is highlighted on the display using known techniques. This enables the performer to readily see the current measure, which is especially useful if he has long silences in his part. A second beat count, BCp (beat count, page) is computed:

$$BCp=BC+S+C;$$

where S and C are the speed and complexity factors described above.

In step 514, BCp is compared to the beat count at the end of the current page, to determine if it is time for a page turn. The addition of S and C (one or both of which may be negative numbers) to the actual beat count BC thus has the effect of causing a page turn earlier (or later) than would otherwise occur, modified by speed and or complexity of the score. If step 514 tests "no", then process flow reverts to step 512 and the beat count is again incremented. If the test of step 514 returns "yes", the page is turned in step 516 and the process ends for the current page.

Those skilled in the art to which the invention relates will appreciate that yet other substitutions and modifications can be made to the described embodiments, without departing from the spirit and scope of the invention as described by the claims below. For example, a "page turn" may be a rapid change from one page to the next when a single page is displayed, or a page shift when two or more pages are simultaneously displayed (display pages 3,4 then 4,5, then 5,6 for example). Scrolling a score is another alternative, especially useful if vertical scrolling is employed to keep the current musical system (a group of measures on the same line) near the center of the display screen, thus allowing the performer to look both forward and back a number of lines. Modification of page turn timing or scrolling speed may automatically occur responsive to tempo changes in the actual performance. Comparison of spoken words to a script, with appropriate visual and/or audible feedback of deviations, can be used for learning a language. Similarly, comparison of performance audio to the script or score provides knowledge of place in the text or score, facilitating automated lighting changes or other such changes during the performance. The absence of performance audio for longer than a preset time can automatically enable a prompting process, using visual or audible cues.

What is claimed is:

1. A method for providing automatic feedback about a vocal, instrumental or similar performance, comprising:
   electronically analyzing audio data signals derived from the performance to identify parameters associated with the performance, wherein the identified parameters relate to at least one of the score or the script of the performance;

comparing the identified parameters for providing the feedback, wherein the comparing is associated with the performance to parameters associated with at least one of the performance's score or script, wherein the comparison relates to at least one of a score or script timing, score or script differences, or score or script displaying; and electronically analyzing page turning in a first performance and setting an advance or delay for the timing of a page turn for a second performance based on the page turning history of the first performance.

2. The method of claim 1, wherein the analyzing and comparing steps operate to determine correspondence between time points in the performance and places in the score or script.

3. The method of claim 2, wherein the feedback comprises automatically sequencing pages of the score or script with the performance.

4. The method of claim 3, wherein the feedback comprises displaying a particular page of the score or script on a display at a particular time.

5. The method of claim 4, further comprising setting an advance or delay for the timing of page turns of the score or script; and displaying the page of the score or script at a time determined by the analysis and comparison and the setting for the advance or delay.

6. The method of claim 5, further comprising marking the page of the score or script to show the current point in the performance.

7. The method of claim 6, further providing an alerting notification when a particular point in the performance is reached.

8. The method of claim 2, wherein the feedback relates to an event scheduled to occur at particular places in the at least one of score or script, wherein the feedback relates to the event's timing.

9. The method of claim 8, further comprising providing synthesis of sounds in correspondence with the feedback.

10. The method of claim 9, wherein instrumental sounds of an instrument are provided in tempo correspondence with the event's timing in the performance of instrumental sounds of another instrument.

11. Apparatus for providing automatic feedback about a vocal, instrumental or similar performance, comprising:

means for analyzing retrieved audio data signals and identifying parameters associated with the performance, wherein the identified parameters relate to at least one of the score or script of the performance;

means for comparing the identified parameters associated with the performance to parameters associated with at least one of the performance's score or script, wherein the comparison relates to at least one of a score or script timing, score or script differences, or score or script displaying;

means for providing feedback about the performance based on the comparison, wherein the feedback relates to at least one of displaying the difference, commonality or relationship between compared parameters; and means for electronically analyzing page turning in a first performance and setting an advance or delay for the timing of a page turn for a second performance based on the page turning history of the first performance.

12. Apparatus as in claim 11, wherein the means for analyzing and the means for comparing operate to determine correspondence between time points in the performance and places in the score or script.

13. Apparatus as in claim 12, wherein the means for providing feedback includes means for automatically sequencing pages of the score or script with the performance.

14. Apparatus as in claim 13, wherein the means for providing feedback includes a display, and a means for displaying a particular page of the score or script on the display.

\* \* \* \* \*